Aug. 28, 1945.    D. M. SELLEW    2,383,570
HYDROCARBON RESISTANT, LIGHT PRESSURE SEALING GASKET STRUCTURE
Filed Nov. 23, 1942
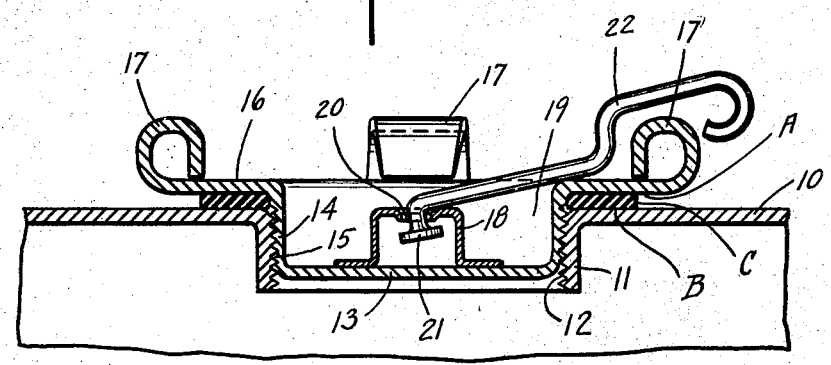
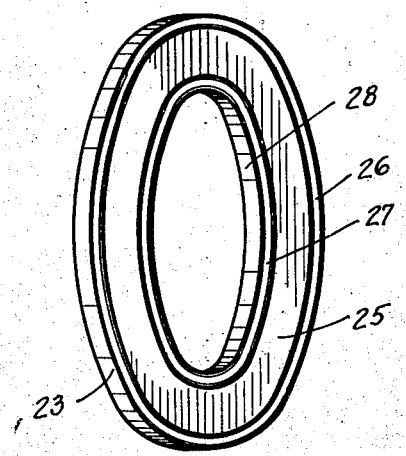
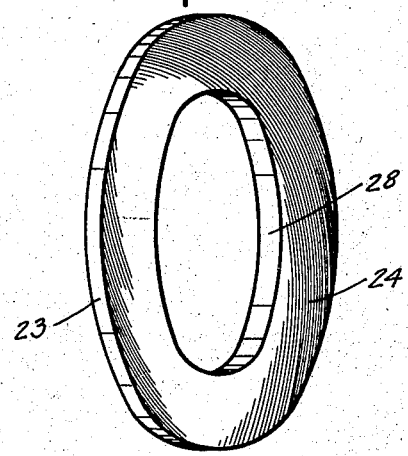
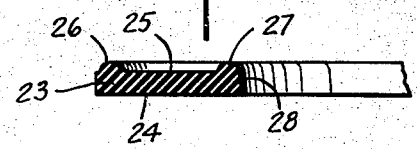
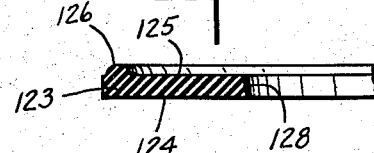
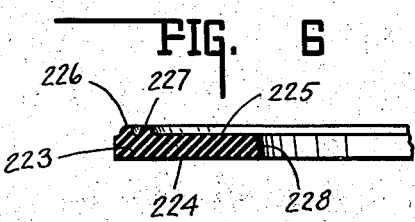
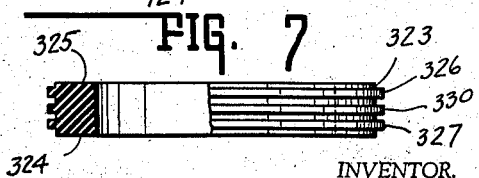
INVENTOR.
DAVID M. SELLEW.
BY Lockwood, Goldsmith & Galt,
ATTORNEYS.

Patented Aug. 28, 1945

2,383,570

UNITED STATES PATENT OFFICE 2,383,570

HYDROCARBON RESISTANT, LIGHT PRESSURE SEALING GASKET STRUCTURE

David M. Sellew, Auburn, Ind.

Application November 23, 1942, Serial No. 466,615

1 Claim. (Cl. 288—23)

This invention relates to a gasket structure for quick sealing containers.

For mechanized transportation purposes, such as tanks, jeeps, armored cars, automobiles, artillery, tractor elements, as well as planes for military and/or civilian use in may parts of the world, liquids such as gasoline, oil, water, etc., are handled almost exclusively in five gallon cans, although thirty and fifty-five gallon tanks may be used.

The non-availability of natural rubber in the present war has caused an acute condition as follows:

Heretofore natural rubber gaskets and cans have been used once and discarded. Now such containers are repeatedly used. Such initial use, however, even with natural rubber gaskets being available so far as the can itself is concerned, is not without objection, for the natural rubber gaskets when exposed to some solvents rapidly deteriorate. Also, repeated sealing actions progressively reduce the effective sealing action of such a gasket, notwithstanding the character of such gasket, which must not creep or squeeze out under the fitting cap or plug, if a wrench is applied to tighten same. Second, it must seal with hand pressure. Third, it must screw off or unseal at the same pressure and lastly it must not seep, wick or deteriorate when filled with liquids such as gasoline, oil, water, etc., and held for long periods of time.

From the foregoing it will be realized that large stocks of fuel or water can only be accumulated by the collection of a large number of these cans transported by pack animal or porter.

Long waiting storage periods, large accumulations, and lack of natural rubber, requiring use of gaskets, etc., heretofore have not constituted any problem.

Now, however, the situation is critical and hence the chief object of this invention is to provide a gasket which has none of the objections mentioned and which will function according to the foregoing requirements.

This objective is accomplished by the use of a specially designed synthetic rubber gasket, as herein described.

Tests have demonstrated that certain synthetic rubbers do not deteriorate, do not swell and will not creep when the gasket has a relatively large bearing surface. Such a gasket, however, required a tremendous amount of friction and pressure to compress the gasket to effect the proper sealing action. Once sealed, such a gasket could not be readily manipulated manually for unsealing.

Synthetic rubber material of a minimum amount, due to its cost, should be utilized. To keep this amount down various fillers are utilized. These fillers generally tend to increase the hardness of the product. Therefore, the smaller the amount of synthetic or even natural rubber included in the basic material will result in a greater hardness, which means that the product has a greater resistance to hand pressure and with comparatively large seals. Consequently, the hand pressure limitations, for reasons assigned, are critical. The form of the invention to a large extent eliminates the hardness factor, as evidenced by the increased hand pressure requirement.

The present invention, therefore, solves the last mentioned problems.

Base materials, commonly called synthetic rubbers, may be poly-chloroprene, butadiene copolymerized with acrylonitrile, and other solvent resisting types of synthetic rubber.

These materials do not dissolve or break down, evidenced by swelling when subject to oil, grease, etc. Furthermore such material is sufficiently hard to prevent creep and resist wear.

In gaskets of the character mentioned, slight imperfections of large area on the flat surface of a flat gasket, or in the container gasket seat or on the plug results in non-sealing, because at such imperfection the gasket will not be properly compressed for sealing.

It has been discovered that a comparatively small rib or ridge, such as of $\frac{1}{32}''$ in height, requires very little frictional pressure for compression and effective sealing, instead of requiring the entire face of the width of the gasket to produce the actual seal.

It has also been discovered that the gasket face, opposite the ribbed face, if roughened, facilitates holding the gasket stationary by frictionally engaging the adjacent bearing face of the plug, which usually carries the gasket.

The primary objectives and features of the invention having been elaborated upon, reference will be had hereinafter to other objectives and features.

The full nature of the invention will be more fully understood from the accompanying drawing, and the following description and claim:

In the drawing

Fig. 1 is a central sectional view of a portion of a sealed container including the invention.

Fig. 2 is a perspective view of the preferred form of gasket looking at the ribbed face thereof.

Fig. 3 is a similar view of the roughened face side of said gasket.

Fig. 4 is a transverse or radial sectional view of the same gasket.

Fig. 5 is a similar view of a second gasket embodiment.

Fig. 6 is a similar view of a third gasket embodiment.

Fig. 7 is a central sectional view of a second broadly different gasket, same being of comparatively great thickness, sealing being effected by compression thereinbetween the flat faces and parallel thereto, instead of by compression lateral to the flat faces, as in the several flat gaskets illustrated in Figs. 1 to 6 inclusive.

In Fig. 1, 10 indicates a container having an inturned tubular portion 11 internally threaded at 12. A plug has the end 13, the tubular wall 14 externally threaded at 15 and provided with a supposedly (but usually not) flat faced flange 16 outwardly directed. Extending therefrom are the quadrant positioned curled ears 17. These form seal anchors and finger grips when desired. A U-shaped clip 18 is nested in the well 19 of the plug and is apertured at 20 to retain head 21 of a hook member 22. Preferably, the thickness or width of flange 16 is about one-half inch. The aforesaid structure is conventional and herein illustrated only by way of example.

It is to be understood the plugs are steel drawings or forgings and the threaded container portion in the container head or side wall is also drawn. Hence, the confronting faces A and B, respectively, while supposedly parallel and smooth, usually are not either.

Sealing therebetween can only be effected by compression of the gasket C. The problems of such sealing have been previously set forth. The preferred form of gasket C is illustrated in Figs. 2 to 4, inclusive.

Therein the annular body of portion 23 has the flat but slightly roughened face 24 that engages face A of the plug so that the gasket will ride with plug by frictional adhesion therebetween in the tightening and loosening of the plug in the threading and unthreading thereof respectively.

To effect proper sealing under the operating conditions previously specified, there is provided on the container confronting face 25 of the gasket a continuous sealing means herein in the form of a concentric ridge 26 near the outer edge of the gasket. If desired, a second sealing rib or ridge 27 near the central hole of the gasket may be provided. This hole has a tapered wall 28 since the plug is slightly tapered as well as portion 11.

When either or both of the ribs are compressed, and coextensive therewith, sealing is effected notwithstanding other irregularities mentioned. Hence, sealing pressure and unsealing effort need only be sufficient for adequate compression of the rib means to effect sealing and plug removal respectively.

Reference will now be had to Fig. 5 wherein numerals of the one hundred series designate portions similar to those illustrated in Fig. 4 and designated by the primary numerals. In this embodiment the outer rib only is employed.

In Fig. 6 there is illustrated a third embodiment, similar numerals of the two hundred series indicating similar portions. Herein the two concentric ribs 226—227 are positioned close together and adjacent the outer edge. With this form the heighth and width of the rib need not be as large as those illustrated in Figs. 4 and 5.

In Fig. 7 there is illustrated a thicker gasket commonly called a cylindrical gasket. It has two substantially parallel faces 325 and 324 and an inner cylindrical surface 328 that may be roughened, or one of the faces 324—325 may be roughened for adhesion purposes. The outer cylindrical surface 323 concentric with surface 328 includes outwardly directed rib-rings integral with the body portion of the gasket. Herein all are parallel and continuous. 326 designates the outer rings and 327 an intermediate ring. Any number may be utilized, but at least two is preferred in this broad form of the invention.

While the invention has been illustrated and described in great detail in the drawing and foregoing description, the same is to be considered as illustrative and not restrictive in character.

The several modifications described herein, as well as others, which will readily suggest themselves to persons skilled in this art, all are considered to be within the broad scope of the invention, reference being had to the appended claim.

The invention claimed is:

A sealing ring-like gasket of solvent resistant, rubber-like material and adapted for rotation and for inclusion between two ring arranged confronting comparatively smooth faces of two threaded members connectible by relative rotation therebetween whereby the faces approach each other, one member having a portion extending into the other, said gasket comprising an annular comparatively flat body portion having appreciable resistance to low pressure compression and having a radial width not less than three times the thickness for surrounding the extending portion of the one member and through which the extending portion projects when threaded into the said other member, said flat body portion of the ring having a central tapered aperture and the one member confronting face being roughened, and a plurality of integral annular rib means projecting from the other face of the body portion for member face engagement and readily yieldable under a comparatively low pressure, said rib means being concentric with the axis of rotation and spaced one from the other, said gasket initially sealing for temporary use by comparatively low pressure compression and by rib means flattening and finally sealing for semi-permanent use by comparatively high pressure compression of the flat body portion exerted solely between the member faces incident to member rotation, said gasket also being subject to rotational distortion incident to the member rotation.

DAVID M. SELLEW.